Figure 1:
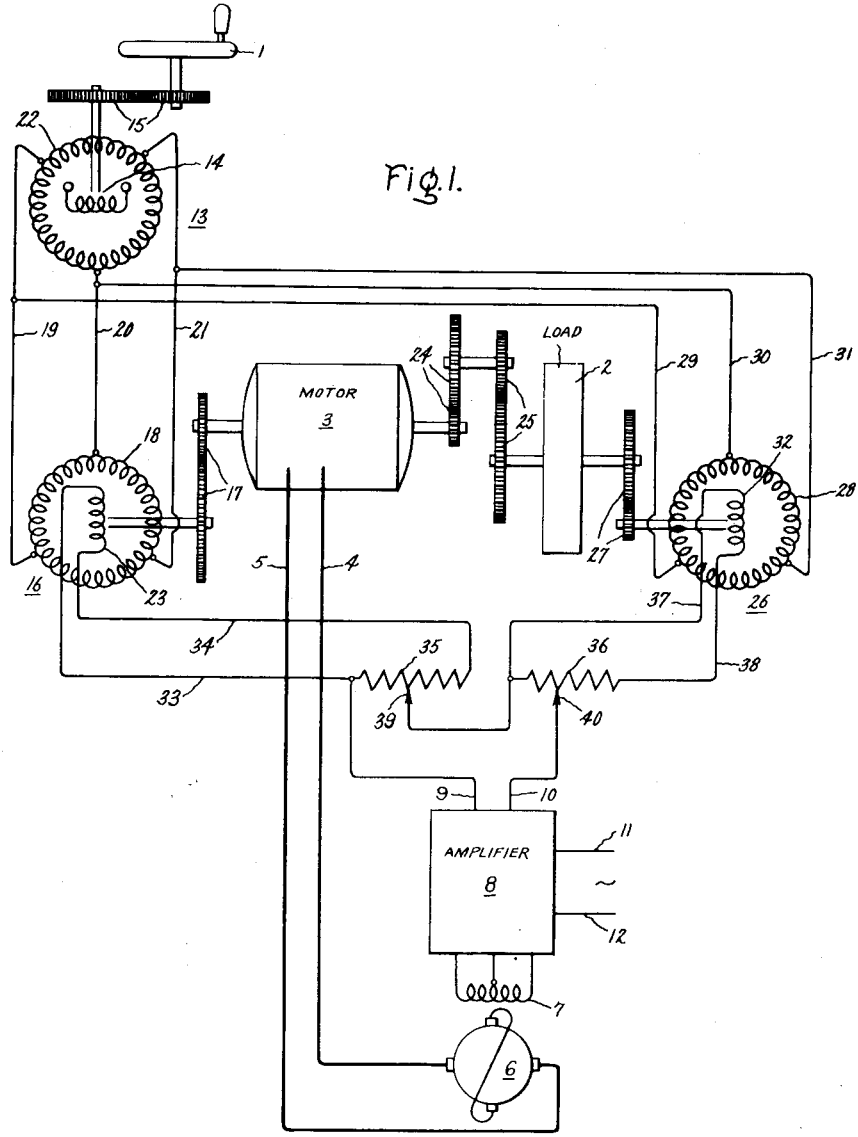

Inventors:
Frederick H. Belsey,
David T. Broadbent,
by Claude H. Mott.
Their Attorney.

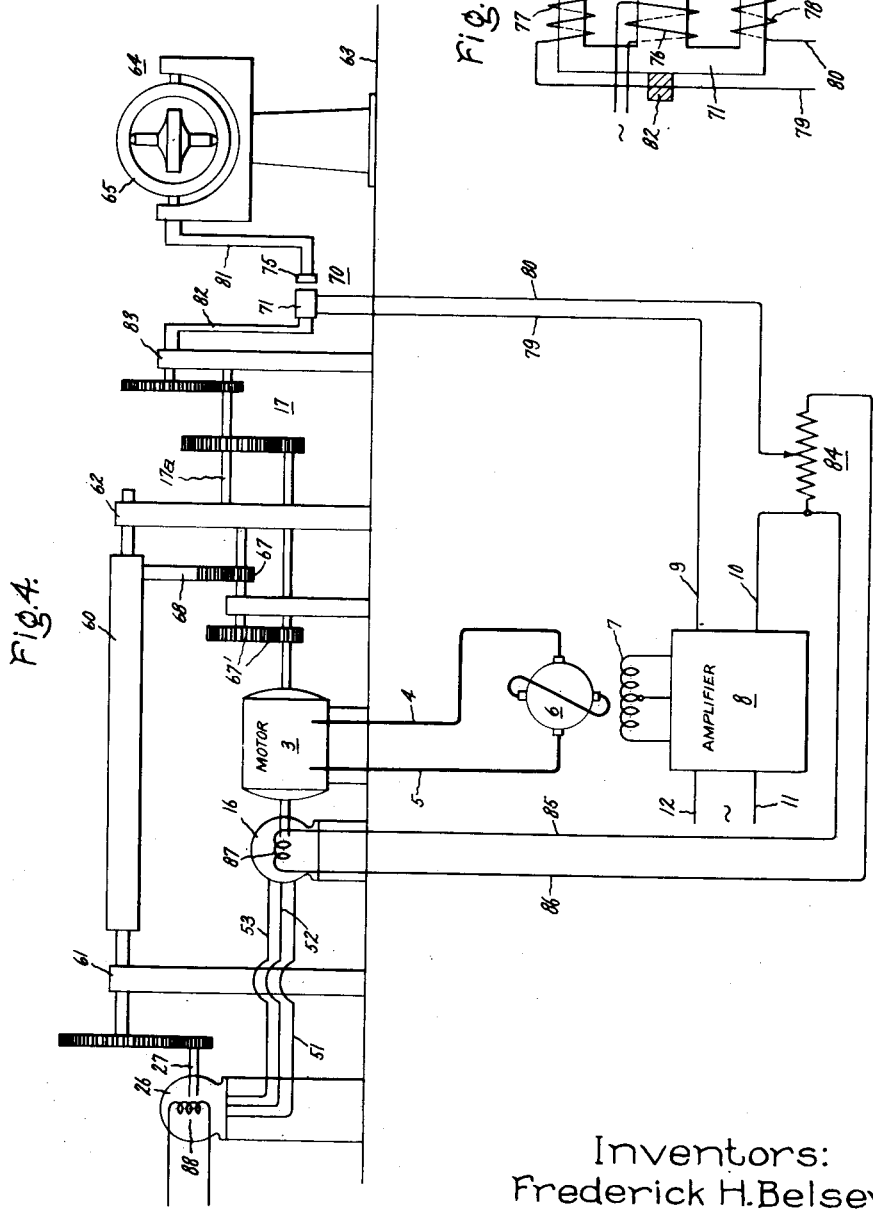

Patented Jan. 15, 1952

2,582,221

UNITED STATES PATENT OFFICE 2,582,221

CONTROL SYSTEM OF THE CORRESPONDENCE KIND FOR MOVABLE MEMBERS

Frederick Harold Belsey, Sale, and David Travis Broadbent, Stretford, England, assignors to General Electric Company, a corporation of New York Application December 16, 1948, Serial No. 65,708
In Great Britain April 25, 1945

6 Claims. (Cl. 318—30)

1

This invention relates to control systems of the positional correspondence kind, that is to say control systems for maintaining a movable member in a required position corresponding with that of a fixed or movable control member or object, such as in alignment with a control member.

In practical arrangement of control systems of the kind referred to above the operation must be made to depend not only on the departure of the movable member from the desired position, which departure will hereinafter be referred to for convenience simply as misalignment, but the operation of the motive equipment or source of power must depend upon other quantities related to the motion of the movable member, and of the controlling member or object where the latter is itself movable, in order that hunting, namely a condition of sustained or insufficiently damped oscillation of the movable member about its required position, shall be prevented. Thus it is necessary that the movement of the movable member shall be damped and in order that the stiffness of control shall not be adversely affected by this requirement for damping of the movable member the additional control is preferably obtained by damping of the movable member in relation to the controlling member or object, that is to say there is produced on the movable member a component of torque responsive to and dependent on the velocity of the movable member with respect to its position of alignment during changes of the latter, which component of torque opposes said velocity.

In positional control systems the tendency to hunting arises when time lags in the control system cause the movement of the movable member in response to changes in the misalignment to lage behind said changes and this tendency becomes greater as the stiffness of control is increased, as hereinafter explained.

The stiffness of control may conveniently be defined as the torque which is applied to the movable member for a given amount of misalignment.

One particular cause of hunting is the presence of backlash or resilience in the drive to the movable member from the motive equipment or source of power for the movable member, as may arise for example where the motive equipment is connected with the movable member through a reduction gear train; the present invention has for its object to provide in positional control systems of the kind set forth, arrangements for eliminating or reducing this tendency

2 to hunting whereby corresponding greater stiffness of control may be utilised. It will be appreciated that increasing the stiffness of control normally tends to increase the tendency to hunting since the natural frequency of the movable member and control system, determined by the inertia of the movable mass of said member and the control stiffness, will thereby be increased.

If the means responsive to misalignment in control systems of the kind set forth is driven from the movable member, the control quantity dependent on the misalignment will correctly indicate the position of the movable member relative to the required position thereof at any time, but a tendency to hunt arises where backlash, or equivalently resilience, is present in the drive from the motive equipment to the movable member since the motive equipment can then execute displacements within the range permitted by the backlash without moving the movable member and therefore without moving the misalignment responsive means. The result of such movement of the motor independently of the misalignment responsive means is to introduce a time lag in the response of the control system to movements of the motive equipment since said responsive means will not operate in phase with the motive equipment and as stated above such time lags can give rise to hunting.

It is therefore preferable in many cases for said misalignment responsive means, instead of being connected for movement with the load, to be coupled with the motive equipment independently of the load and the main gear between the latter and the motive equipment. The control system then operates to maintain the motive equipment in predetermined relationship with the controlling member or object, but this reduces the accuracy of correspondence of the movable member with the required position thereof by the amount of the backlash.

According to the present invention, means are provided responsive to relative movement between the motive equipment and the movable member for producing a resultant control action partly in dependence on movement of the movable member with respect to the required position thereof and partly in dependence on movement of the motive equipment with respect to the position thereof corresponding with the required position of the movable member, whereby to give less stiffness of control for movement of the motive equipment away from the position corresponding with the required position of the movable member independently of corresponding movement of the movable member, as a result of backlash or resilience in the drive between said equipment and said member, than for movement of the motive equipment and movable member in correspondence with one another away from the required position of the movable member.

In carrying out the invention, the misalignment responsive means may include a pair of control elements one of which is coupled with the movable member so as to execute displacements corresponding with the displacement of said movable member independently of backlash or resilience between the motive equipment and the movable member, and the other of which elements is coupled with the motive equipment independently of the movable member, and in which the control system is responsive to a control quantity comprising two components dependent respectively on the displacements of said control elements with respect to the required position, and additive for movements of said movable member and motive equipment together. Alternatively, the control system may comprise, in addition to means responsive to the movements of the movable member or the motive equipment therefor with respect to the required position, further means differentially responsive to the movements of the movable member and the motive equipment and producing an additional component in the control quantity applied by said first means to control means for governing the operation of the motive equipment.

Control systems of the kind referred to for maintaining a movable member in positional correspondence with a control member comprise, in general, transmitter and resetter control elements which are coupled respectively with the control member and the movable member (or equivalently directly with the motive equipment) and co-operate with one another so as to produce a control action on the motive equipment in response to departure of said elements from a predetermined mutual relationship, thereby producing on the movable member a torque directed to reduce said departure to zero and so maintain the required positional correspondence between the movable member and controlling member. According to another aspect, the present invention provides, in combination with such transmitter element coupled with the controlling member, two resetting elements coupled respectively with the motive equipment and the movable member and interconnected with said transmitting element so as respectively to produce control quantities dependent on the displacements of the motive equipment and movable member, respectively, with respect to the controlling member, and means for applying to the control means for governing the operation of the motive equipment a control quantity comprising the algebraic sum of said two control quantities. Preferably, said control quantities are applied to the means governing the operation of the motive equipment through means such as a potentiometer circuit in the case of electrical control systems, adapted to adjust the relative magnitude of such control quantities applied to said control means. In another arrangement, resetting devices coupled respectively with the motive equipment and the movable member may be interconnected with one another and the transmitter device coupled with the controlling member, whereby one of said devices is differentially subject to the movements of the other two devices so that there will be applied to one of said resetting devices a control quantity dependent on the displacement of the transmitter device and there will be derived from said resetting device a control quantity differentially dependent on the displacements of the transmitter device and said resetting device, whilst the other resetting device to which said second control quantity is applied, produces a control quantity differentially responsive to said preceding control quantity and the displacement of said second resetting device, control means responsive to the last-mentioned control quantity governing the operation of the motive equipment. In alternative arrangements producing equivalent operation, as will hereinafter be explained, the system comprises means differentially responsive to displacement of the controlling member and the movable member or the motive equipment, and means responsive to relative displacement between the movable member and the motive equipment arranged to add a component to the control quantity produced by said first means and applied to control means for governing the motive equipment, in the direction to oppose movement of the motive equipment relatively to the movable member.

In the following description embodiments of the invention will be briefly described by way of example in which the control system is of an electrical kind. It will, however, be understood that the invention is not limited in this respect but may, with suitable modifications, be employed in conjunction with power equipments of any desired kind and with means responsive to the movements of the movable member and motive equipment of any other desired form than electrical.

Reference will now be made to the accompanying drawings, the Figs. 1, 2, 3 and 4 of which show diagrammatically four embodiments, respectively, of the invention, by way of example, whilst Fig. 5 shows a detail of Fig. 4. Similar parts in the several figures are denoted by like reference numerals.

Referring first to Fig. 1, the embodiment of the invention therein shown is applied to a control system in which the angular position of a hand-wheel or other control member 1 determines the angular position of a movable member 2 or load device. This movable member is driven by a motive equipment which in the example illustrated comprises a direct current electric motor 3, the armature of which is connected by conductors 4 and 5 in the output circuit of a crossfield or armature reaction generator 6, preferably of the metadyne kind. This generator has a controlling field winding 7 connected in the output circuit of an amplifying means 8 arranged to produce by means of the field winding 7 a controlling field in the generator 6 dependent in magnitude on the amplitude of an alternating input voltage applied to conductors 9 and 10, and dependent in sense on the sense of said alternating input voltage in relation to a reference voltage of the same frequency applied to conductors 11 and 12. The means 8 will also be arranged to cause the output current thereof to include in addition a component dependent on the first time derivative of the amplitude of the input voltage, for example, said means preferably comprises a thermionic tube circuit arrangement such as described in the cognate specification of application for British Letters Patent No. 592,208 (United States Patents 2,536,876 and 2,528,486) and shown at D in Fig. 1 of said cognate specification.

The control member 1 is coupled with the rotor of a selsyn device 13 forming the transmitter element of the remote control system. This rotor carries a single-phase winding 14 energised from the same source of alternating current as the conductors 11 and 12. A gear train 15 may be included in order to obtain the desired displacement of the selsyn rotor in relation to that of the control member. A second selsyn device 16, forming one resetting element of the system, has its rotor coupled with the armature of the motor 3 through a gear train 17. The selsyn 16 has a distributed stator winding 18 with tappings interconnected by conductors 19, 20 and 21 with corresponding tappings of a distributed stator winding 22 of the selsyn 13. The selsyn 16 is provided with a single-phase rotor winding 23 which, as hereinafter described, is connected to apply to the conductors 9 and 10 a voltage which is dependent on the extent of departure of the rotors of the selsyns 13 and 16 from the illustrated angular relation in which rotor winding 23 is electrically perpendicular to rotor winding 14. The arrangement as so far described will operate in the same manner as the equipment shown in Fig. 1 of the complete specification aforesaid, to which attention is directed for a full description of the operation.

It will be understood that where the control system includes two transmitter elements with high and low gear ratios with respect to the control member, with correspondingly geared resetting elements, to provide fine and coarse control such as illustrated in Fig. 1 of the cognate specification of application for British Letters Patent No. 592,208 aforesaid (U. S. Serial Nos. 610,353 and 610,356), the arrangements according to the present invention will usually only need to be employed in conjunction with the fine control. For this reason, in Fig. 1 only the parts of the system for the fine control are shown.

The motor 3 is connected with its load 2 through a reducing gear train 24, 25, which will introduce backlash between the motor and load and as a result reduce the permissible stiffness of control and accuracy of alignment of the load with the required position thereof as determined by the position of the control member for reasons hereinbefore explained.

In order to reduce or eliminate these undesirable effects, the present invention provides, according to the embodiment shown in Fig. 1, a selsyn device 26 forming a further resetting element which is coupled with the movable member 2 independently of the power gearing 24, 25, such as through the gear train 27. This selsyn has a distributed stator winding 28 with tappings interconnected by conductors 29, 30, and 31 with the corresponding tappings of the stator winding 22 of the selsyn 13. The rotor of the selsyn 26 is provided with a single-phase winding 32 arranged as hereinafter described to apply to the conductors 9 and 10 a voltage dependent on the extent of the departure of the load 2 from its position of alignment with the movable control member, the rotor winding 32 being electrically perpendicular to the rotor winding 14 of selsyn 13 for such condition of alignment, as shown in Fig. 1.

The rotor winding 23 of the selsyn 16 is connected by conductors 33 and 34 with the ends of a potentiometer 35, whilst the rotor winding 32 of the load selsyn 26 is connected with the ends of a potentiometer 36 by conductors 37 and 38. The conductor 9 is connected with the conductor 33, the variable tapping point 39 of the potentiometer 35 is connected with the conductor 37, and the conductor 10 is connected with the variable tapping point 40 of the potentiometer 36.

In the operation of the arrangement shown in Fig. 1, the resultant control action applied to the amplifier 8, namely the voltage applied to the input conductors 9 and 10 of the amplifier 8 will comprise two components derived respectively from the two potentiometers 35 and 36, and therefore dependent on the angular displacements of the rotor windings 23 and 32 of the Selsyns 16 and 26 from positions electrically perpendicular to the rotor winding 14 of the transmitter Selsyn 13, the magnitude of these component voltages for a given value of the corresponding Selsyn rotor voltages being determined by the setting of the tapping point 39 and 40, respectively.

The gear ratio between the motor 3 and the rotor of the selsyn 26, through the gear train 24, 25 to the movable member 2 and gear train 27, is in this embodiment of the invention equal to that between the motor and the rotor of the Selsyn 16, so that for any position of the control member 1 and transmitter Selsyn 13, in the corresponding position of the movable member the rotor voltages of both Selsyn 26 and Selsyn 16 will be zero. The equipment therefore operates substantially as described with reference to Fig. 1 of the cognate specification of application for British Letters Patent No. 592,208 aforesaid (U. S. Serial Nos. 610,353 and 610,356). Thus, for any movement of the movable member 1, and assuming a corresponding movement with no backlash of the motor, the rotors of both Selsyns 16 and 26 will be displaced equally and the sum of the voltages derived from the two potentiometers 35 and 36 will be applied to the input conductors 9 and 10 of the amplifier 8 to produce corresponding control of the motor armature current and torque applied to the movable member. Movement of the motor independently of the movable member within the range permitted by the backlash in the gear train 24, 25, will, however, produce corresponding displacement of the rotor winding 23 of the selsyn 16 without displacing the rotor of the Selsyn 26, so that a corresponding torque will be produced, but, for a given movement of the motor within said range of the backlash, will be less than the torque produced for the same movement of both the motor and movable member together. By means of the two potentiometers 35 and 36, the relative proportions of the two output voltages may be adjusted by experiment to the optimum value. The movable contact members of said potentiometers may conveniently be ganged together so that the total voltage produced for a given movement of motor and movable member together will be maintained at one constant value over the range of adjustment of the relative values of the said two output voltages.

The relative proportions of the output voltages from the Selsyn 16 and the Selsyn 26 will in general be dependent upon the ratio between the inertia of the movable member, referred to the motor shaft, and the motor inertia, the optimum proportion of the total input voltage to the amplifier 8 derived from the Selsyn 26 for a given movement of the motor and movable member together tending to increase as said ratio is increased and theoretically being equal to the ratio of load inertia to total inertia, both referred to the said shaft in the case of a remote control system for causing displacements of the load proportional to those of a movable control member as in Fig. 1. In general, however, it will be necessary for the optimum setting to be found by trial and error.

It will be understood that where the resetter Selsyns 16 and 26 are coupled with the motor shaft and the movable member respectively, through appropriate gear trains, as is shown in Fig. 1, such gear trains, since they only have to transmit the torque for operating the Selsyns, can be made to operate without appreciable backlash.

Since the total control quantity is dependent on the sum of the displacements of the selsyn rotor windings 23 and 32 from their positions electrically perpendicular to the rotor winding 14, it is clear that the resultant voltage applied to the conductors 9 and 10 is equivalent to a voltage containing in algebraic addition to a component proportional to the misalignment of the movable member 2 from its position in correspondence with that of the control member 1, a further component which is dependent upon movement of the motor with respect to the load and is in the direction to oppose such movement of the motor. This component may be considered to suppress movement of the motor within the backlash of the power gearing and has a magnitude appropriate to the inertia of the motor, apart from the movable member, as not to produce excessive stiffness of the control as regards the motor alone, without reducing the stiffness of control provided for movements of the motor and load together.

Figure 2:
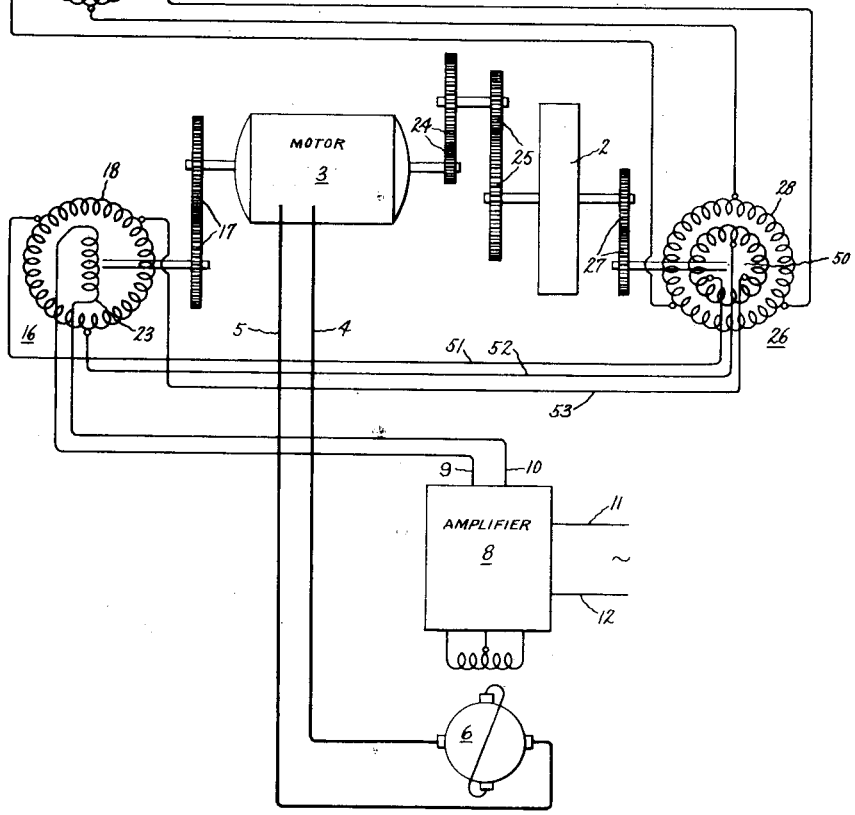

Fig. 2 shows a modification of the arrangement of Fig. 1 in which instead of two separately derived voltages respectively dependent on the displacements of the motor and load with respect to the control member being added algebraically by the potentiometers 35 and 36 of Fig. 1, the Selsyn 16 is arranged to apply to the conductors 9 and 10 a voltage itself dependent on the movements of the motor and load respectively. In other words, as will appear, the three Selsyn devices are connected in cascade relation with one another.

In Fig. 2, the rotor of the Selsyn 26 is provided with a distributed winding 50 and the tappings of the stator winding 18 of the Selsyn 16, instead of being connected with the stator winding 22 of the transmitter Selsyn 13, are connected by conductors 51, 52, and 53 with corresponding tappings of said winding 50. The rotor winding 23 of the Selsyn 16 is connected directly with the input conductors 9 and 10 of the amplifier 8.

In the operation of the arrangement of Fig. 2, the stator winding 28 of the selsyn 26 sets up in the latter an alternating magnetic field, the axis of which is in angular alignment with the axis of the rotor winding 14 of the transmitter selsyn 13. This alternating magnetic field induces alternating voltages in the distributed winding 50 of the rotor, causing currents to flow in the stator winding 18 of the selsyn 16, which currents reproduce in the selsyn 16 an alternating magnetic field having an axis which is displaced from that in the selsyn 26 by an angle equal to the angle of displacement of the tappings of the rotor winding 50 of the selsyn 26 from the tappings of the stator winding 28 of said selsyn 26. The output voltage induced in the rotor winding 23 of the selsyn 16 is dependent upon the displacement of said rotor winding from a position in which its axis is perpendicular to that of the alternating magnetic field set up by the stator winding 18 in said selsyn.

Assuming first that the movable member 2 is positioned in alignment with the control member 1, then the magnetic field in selsyn 16 will be disposed perpendicularly to the rotor winding 23 of said selsyn and the voltage applied to conductors 9 and 10 will be zero. Assume now that the control member is displaced in one direction. The axis of the magnetic field in the selsyn 26 will be correspondingly displaced in the same direction. The interconnections 51, 52, 53 between the rotor winding 50 of this selsyn and the stator winding 18 of the selsyn 16 are arranged so that this displacement of flux will cause a displacement in the corresponding direction, and by the same amount, of the axis of the flux in the selsyn 16. The resultant voltage induced in rotor winding 23 and applied to the amplifier 8 produces a motor torque tending to move the movable member 2 into alignment with the control member 1, so that the rotor winding of the selsyn 26 is moved in the same direction as said displacement of the magnetic axis in said selsyn; this reduces the displacement of the magnetic field in the selsyn 16, and while this movement of said magnetic field is occurring the rotor winding of the selsyn 16 is also being moved toward perpendicularity with the axis of said field.

The gear ratio of the gear train 27 between the load 2 and slsyn 26, and the gear ratio through the power gearing 25, 24, and train 17 to the selsyn 16, are made such that when the load 2 has been displaced by the same angle or other desired relation, as the control member 1, the sum of the displacements of the rotor winding 50 of selsyn 26 and the rotor winding 23 of selsyn 16, will be equal to the displacement of the rotor winding 14 of the transmitter selsyn 13, so that the winding 14 is again disposed electrically perpendicular to the magnetic field set up by the stator winding 18 in said selsyn 16. It will thus be seen that in regaining this condition in the selsyn 16, the rotors of selsyns 26 and 16 each suffer a displacement less than that of the rotor of the transmitter selsyn 13, and the ratios between the displacements of the rotors of selsyns 26 and 16 to the displacement of the rotor of selsyn 13 represent the proportions of the resetting action derived in accordance with the load and the motor, respectively. In other words the sector values of the selsyns 16 and 26 are in this embodiment of the invention different from the sector value of the transmitter selsyn 13, the sector value being that movement of the movable member or the transmitter, as the case may be, necessary to displace the selsyn in question through one revolution. If S, $S_B$ and $S_A$ are respectively the sector values of the transmitter selsyn, the selsyn 26 and the selsyn 16, the sector values of both selsyns 26 and 16 being referred to the load 2, then it can be shown that $$S = \frac{S_A S_B}{S_A + S_B}$$

Consequently, if the control quantity, namely the voltage applied to the conductors 9 and 10, is desired to depend equally upon the displacements of the motor and the movable member, $S_A$ will be made equal to $S_B$, each equal to 2S.

If the resetting control effects from the motor and movable member are required to be respectively ten percent and ninety percent of the total effect, then $$\frac{S_A}{S_B}=\frac{90}{10}, \text{ and } S_B=1\tfrac{1}{9}S \text{ and } S_A=10S$$

Figure 3:
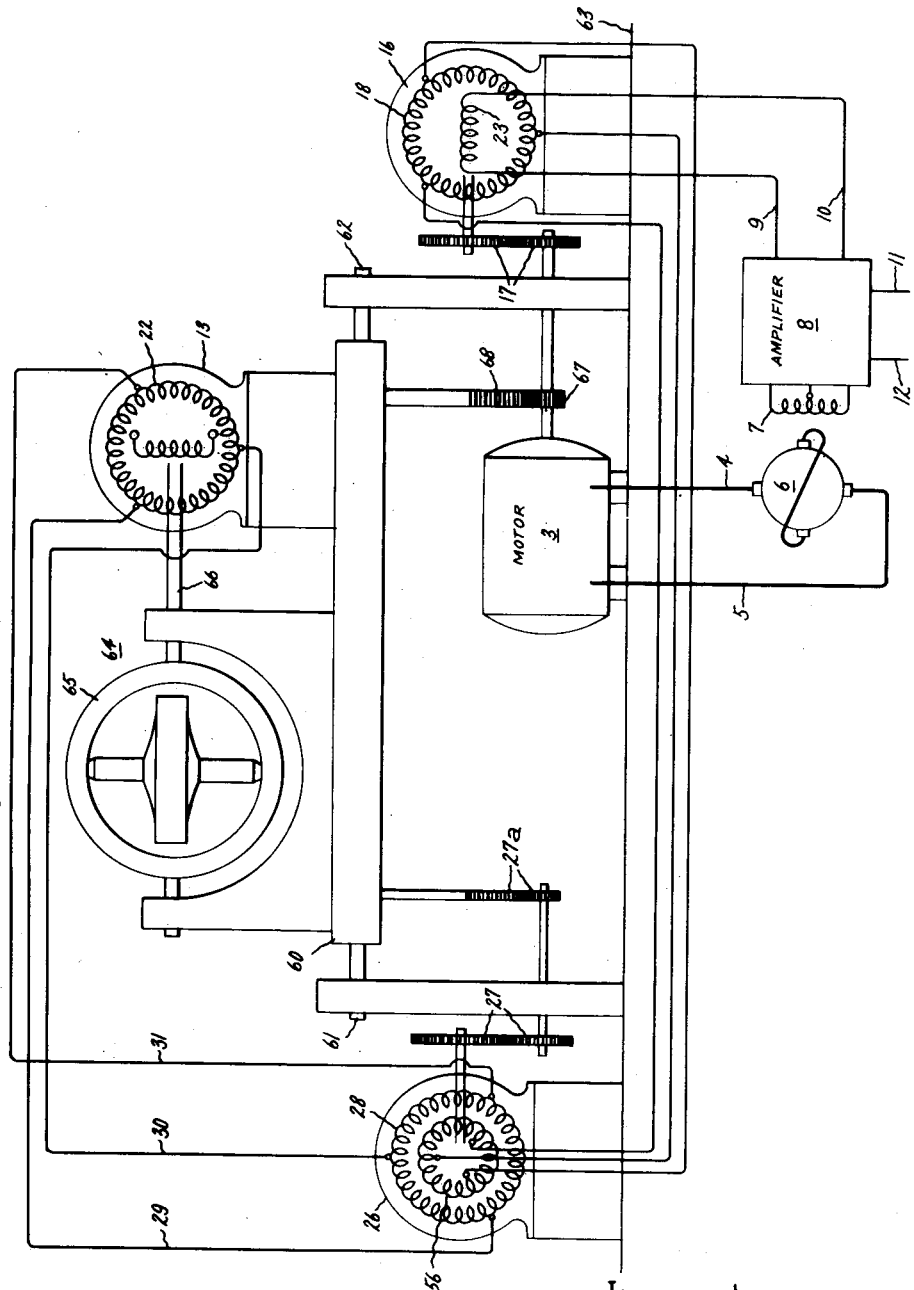

In general, the embodiment according to Fig. 1 will be more convenient than that of Fig. 2, since the percentage resetting obtained from the motor in relation to the resetting obtained from the motor and movable member when moving together may readily be adjusted by the two potentiometers 35 and 36. In the embodiment according to Fig. 2, adjustment of such percentage resetting requires changing the gear ratios between the motor and the movable member and the associated selsyns 16 and 26. Arrangements similar to that of Fig. 2 have, however, a useful application to, and are more particularly intended for, control systems of the kind in which the transmitter selsyn itself operates to provide resetting or follow-up control, that is to say the one member of said selsyn instead of being fixed is displaced in accordance with the displacement of the movable member. This selsyn is thus itself capable of maintaining the movable member in a given position determined by the position of the other member of the transmitter selsyn. An arrangement of this kind is illustrated by Fig. 3, in which the transmitter selsyn 13 is mounted on a platform 60, pivotally mounted by trunnions 61 and 62 on a supporting structure, for example, the deck 63 of a ship, the control system being employed to maintain said platform level irrespectively of rolling of the deck about an axis parallel with that of the trunnions. For this purpose a gyroscope 64 or equivalent position stabilising device is mounted on the platform with its gimbal frame 65 coupled by a shaft 66 with the rotor of the selsyn 13. The motor is mounted on the deck 63 and has its armature coupled with the platform 60 by means of a pinion 67 and an arcuate rack 68 secured to the platform. The rotor of the selsyn 26 is coupled with the platform by a further arcuate rack and pinion 27a, and gear train 27, whilst the rotor of the selsyn 16 is coupled with the armature of the motor by the gear train 17. The stators of both selsyns 16 and 26 are mounted on the deck 63.

It will be understood that the gyroscope 64, instead of being mounted on the platform, may equivalently be mounted directly on the deck, with its shaft 66 coaxial with the trunnions 61 and 62.

The selsyn 13 responds to tilting of the platform 60 with respect to space, namely from the position determined by the gyroscope 64 and rotor winding 14 of said selsyn, to produce a corresponding displacement of the axis of the alternating magnetic field in the selsyn 26.

The selsyns 26 and 16 respond to the position of the platform with respect to the deck, selsyn 26 irrespectively of the backlash in the gearing 67, 68, and selsyn 16 subject to said backlash.

The stator winding 18 of the selsyn 16 is interconnected with the rotor winding 56 of the selsyn 26 so that when there is no relative movement between the motor and platform the displacement of the axis of the magnetic field in said selsyn 16 due to the movement of the selsyn 26 is in the same direction as, and is equal in amount to, that of the rotor of the selsyn 16, so that under these conditions the selsyns 16 and 26 do not modify the voltage which is applied to conductors 9 and 10 from the selsyn 13, that is to say in accordance with the tilting of the platform from the predetermined position thereof. In other words when the platform and motor move together, without backlash effect, modification of the input voltage to the amplifier 8 effected by the two selsyns 16 and 26, respectively, will be equal and opposite to one another so that these selsyns are without effect on the operation of the system. The motor is then energised without modification in accordance with the displacement of the platform 60 from the horizontal position determined by the gyroscope 64. When, however, the motor moves relatively to the platform within the backlash of the gears 67 and 68, only the selsyn 16 will be operated and, due to the displacement of the tappings of rotor winding 56 with respect to the tappings of stator winding 28, will apply to the conductors 9 and 10 a voltage which is proportional to the movement of the motor within the backlash. This voltage has such direction as to produce an output current of the metadyne 8, or a component in said current if the platform is not at rest in alignment with the gyroscope, causing the motor 3 to produce a torque, or a component in its total torque, opposing the movement of the motor within the backlash. The stiffness of the control for such movement of the motor within the backlash is less than that produced by tilting of the platform since the angular displacement of the rotor of selsyn 26 with respect to its stator is made appropriately less than that obtained between the rotor and stator of the transmitter selsyn 13 for tilting of the platform by an amount corresponding with the same movement of the motor, so that the torque produced for said movement of the motor alone is less than that produced by said movement of the platform.

It will thus be clear that the sector value of the selsyn 26 is made greater than the sector value of the transmitter selsyn 13 as referred in both cases to the angle of tilt of the platform 60. Since for movement of the motor and platform together without blacklash the selsyns 26 and 16 are required to neutralize one another they must both have the same sector value. If $S_C$, $S_A$ and $S_B$ represent respectively the sector values of the transmitter selsyn 13, the selsyn 26 and the selsyn 16, then the ratio $$\frac{S_C}{S_A}$$

and consequently also the ratio $$\frac{S_C}{S_B}$$

is made equal to the desired ratio between the amount of resetting obtained from the motor alone and that obtained when the motor and platform move together without backlash. For example, if 10% reset from the motor is required:

$$S_A=S_B=\frac{100}{10}S_C$$

and if 50% reset from the motor is required:

$$S_A=S_B=\frac{100}{50}S_C$$

In the above description of Fig. 3 it has been shown that for movement of the motor and load without relative movement such as due to backlash, the effects of the selsyns 26 and 16 neutralise one another and the resetting (or control) is obtained solely from the selsyn 13. The selsyns 26 and 16 respectively produce control quantities, applied to the amplifier 8, dependent on the movements of the motor and the load (platform 60) but acting in opposition to one another for the same sense of said movements. The control quantity derived from the selsyn 26 (motor) acts in the same sense as that derived from selsyn 13 for the same direction of movement of motor and load, so that the control quantity derived from the selsyn 16 (load) acts in opposition to that derived from the selsyn 13. The operation can therefore alternatively be expressed as a reduction of the control quantity derived in accordance with the displacement of the load from the desired position, with the addition of a component proportional to said displacement but derived from the motor, so that for movements of the motor and load without relative movement therebetween the resultant control quantity comprises the sum of two components derived respectively from the load and the motor, the operation therefore being identical in result with that provided by the arrangement of Fig. 1.

As in the arrangement shown in Fig. 2, in order to change the percentage reset from the motor and load, it is necessary to change the gear ratio between the selsyns 26 and 16 and the load. An alternative arrangement for applications of the kind described with reference to Fig. 3, but in which the percentage reset obtained from the motor and load many be adjusted at will without changing said gear ratio, will now be described with reference to Fig. 4.

As shown in Fig. 4, the gyroscope controls the platform through the motor position, that is to say, as hereinafter explained, the motor is controlled in relation to the gyroscope and the load is controlled in relation to the motor. The system to be described with reference to Fig. 4, is, however, applicable also where the gyroscope controls the load position directly, as will hereinafter be described.

In Fig. 4, the gyroscope 64 is mounted on the deck 63 and controls the platform 60 by means of an electromagnetic device 70, which, as shown in more detail in Fig. 5, comprises a laminated core member 71 having three limbs 72, 73 and 74, and a relatively movable armature 75. The control limb 73 carries an exciting winding 76 which is connected with the alternating current supply to the conductors 11 and 12 of the amplifier 8. The outer limbs 72 and 74 carry output windings 77 and 78 which are connected in series with one another between conductors 79 and 80. The windings 77 and 78 are wound in opposition to one another so that when the armature 75 is disposed symmetrically with respect to the two outer limbs 72 and 74, the magnetic flux produced by the exciting winding 76 will divide equally between the outer limbs 72 and 74 to induce equal and opposite voltages in the windings 77 and 78, and the resultant voltage between conductors 79 and 80 will be zero. Displacement of the armature in one direction or the other in the plan of Fig. 5 will modify this balanced condition, producing a voltage between the conductors 79 and 80 having an amplitude dependent on the extent of said displacement and having one sense or the other relative to the voltage applied to the winding 76, according to the direction of said displacement.

Reverting to Fig. 4, the armature 75 is carried by means of an arm 81 from the gimbal frame 65 of the gyroscope, whilst the core 71 is mounted on an arm 82 journalled at 83 and coupled by the gear train 17, which in the example shown includes a countershaft 17a, with the armature of the motor 3. As in Fig. 3 the motor is coupled with the platform by gearing 67 and 68, whilst in the example shown a further stage of reduction gear is included at 67'. The electromagnetic device is mounted with the plane of Fig. 5 tangential to the circular path of the ends of the arms 81 and 82, whereby the voltage produced between conductors 79 and 80 is dependent on the angular misalignment between said arms.

The conductor 79 is connected with the input conductor 9 of the amplifier 8, whilst the conductor 80 is connected with the variable tapping point of a potentiometer 84 one end of which is connected with the input conductor 10. This potentiometer is connected by conductors 85 and 86 in series with the rotor winding 87 of the selsyn 26 coupled with the motor 3. This rotor winding is in Fig. 4 a single-phase winding. The stator winding of selsyn 26 is, as in Fig. 3, a distributed winding interconnected by conductors 51, 52 and 53 with a similar winding of the selsyn 16 coupled with the platform 60, by gear train 27. The rotor winding 88 of selsyn 16 is in Fig. 4 a single-phase winding connected with the same alternating current source as are the conductors 11 and 12 of the amplifier 8.

In the operation of the arrangement of Fig. 4, the device 70 produces an alternating voltage between conductors 79 and 80 which is dependent in magnitude on the displacement of the core 71 with respect to the armature 75 from the relative position shown in Fig. 5, as hereinbefore explained with reference to Fig. 5, and said voltage is therefore dependent on the extent of tilting of the platform 60 from the desired position determined by the gyroscope 64, subject, however, to relative movement between the motor and said platform, that is to say the device 70 is responsive to movement of the motor armature with respect to the position corresponding with that determined by the gyro 64 through the gear train 17. The amplitude of said voltage will be, in one sense or the other, relative to the alternating voltage applied to conductors 11 and 12, according to the direction of tilt of the platform.

The corresponding torque produced by the motor 3 is directed to correct the tilting of the platform, that is to say the latter will be maintained in the desired angular position according to the gyroscope 64.

The selsyns 16 and 26 have the same sector value as one another, referred to the platform 60, so that movement of the motor and platform without backlash or resilience maintains the rotor winding 87 of selsyn 16 always electrically perpendicular to the rotor winding 88 of selsyn 26, and no voltage is applied to conductors 85 and 86 by said winding 87. A portion of the voltage produced in winding 87 upon relative movement of the motor and platform, which portion is determined by the setting of the potentiometer 84, is applied between the conductors 10 and 80. In other words a voltage derived from the relative movements of the motor and load is added algebraically to the voltage derived from the device 70 in accordance with misalignment of the motor from the position determined by the gyroscope. The winding 87 is connected with the conductors 85 and 86 in such direction that movement of the motor independently of the load produces a component of motor torque opposing such movement of the motor. In other words, the voltage derived from the potentiometer 84 in the input circuit of the amplifier for either direction of movement of the motor relative to the platform is in the opposite direction, or subtracted from, the voltage which the device 70 applies to said input circuit for the same direction of movement of the motor.

If $\theta_G$, $\theta_M$ and $\theta_L$ represent respectively the positions of the arm 81 as determined by the gyroscope, the motor 3 in terms of the lever 82, and the platform 60, with respect to space, again in terms of the lever 82, then the voltage applied to conductors 9 and 10 by the device 70 is $K_1(\theta_G-\theta_M)$ where $K_1$ is a constant equivalent to the output voltage of device 70 per unit angle of misalignment of levers 81 and 82. The voltage component applied to conductors 9 and 10 by the selsyns 16 and 26 is $K_2(\theta_L-\theta_M)$, where $K_2$ is another constant determined jointly by the output voltage of selsyn 16 per unit angle of misalignment between the two selsyns, that is between the motor and the platform, and by the setting of the potentiometer 84.

Since the voltage from the selsyns is subtracted from that from the device 70, for the same direction of movement of the motor relative to the gyroscope and the platform, the resultant input voltage to the amplifier is:

$$K_1\theta_G - \{K_2\theta_L + (K_1-K_2)\theta_M\}$$

and since the total voltage derived according to the movements of the motor and load is zero for zero displacement of the platform, the constant $K_1$ represents the total amount of resetting obtained from both motor and load so that the proportion of reset obtained from the load is $$\frac{K_2}{K_1}$$

which is readily adjustable by the potentiometer 84 to produce optimum performance.

As hereinbefore indicated, the arrangement of Fig. 4 may be modified so that the device 70 has its core member 71 coupled with the platform 60, the gyroscope being then either mounted on the deck 63 or on the platform as in Fig. 3. The winding 87 is then connected with the conductors 85 and 86 in such direction that the voltage derived from the potentiometer 84 is in the same direction as that derived from the device 70, when the displacement of the motor is less than that of the platform within the limits of the backlash or resilience in the main drive from the motor to the platform, that is to say the voltage dependent on relative movement of the load with respect to the motor is now added algebraically to that dependent on the tilting of the platform.

In this modification the voltage derived from the device 70 is $K_3(\theta_G-\theta_L)$, where $K_3$ is another constant, to which voltage is added the voltage $K_2(\theta_L-\theta_M)$ from the potentiometer 84, and the resultant input voltage to the amplifier 8 is:

$$K_3\theta_G - \{(K_3-K_2)\theta_L + K_2\theta_M\}$$

and the proportion of reset from the load is $$\frac{K_3-K_2}{K_3}$$

which is again readily adjustable by means of the potentiometer 84.

It will be understood that each of the several embodiments of the invention above described may be employed in combination with other desired means known to those skilled in the art and numerous changes in construction may be made without departing either in spirit or in scope from the present invention. Hence, it is intended that all matter contained in the foregoing description or shown in the accompanying drawings shall be interpreted as illustrative and not in a limiting sense.

What we claim is:

1. A control system comprising, motive equipment, a main load member adapted to be driven by said motive equipment, rigid driving connections between said motive equipment and said load member, alignment means including a pair of control elements and a controlling member coupled thereto, one of said elements being coupled to said load member, and the other of said elements being coupled to said motive equipment independently of said load member, each of said control elements producing a control quantity dependent on its displacement with respect to said controlling member, said control quantities being added algebraically to govern the operation of said motive equipment.

2. A control system comprising, a motor, a main load member adapted to be driven by said motor, rigid driving connections between said motor and said load member, two resetting elements coupled respectively with said motor and said load member, a transmitting element interconnecting said resetting elements and having a controlling member, said resetting elements being adapted respectively to produce control quantities depending on the displacement of said motor and load member, respectively with respect to the controlling member, means for controlling the operation of said motor, and means for applying the algebraic sum of said control quantities to said controlling means.

3. A control system comprising, a motor, a main load member adapted to be driven by said motor, rigid driving connections between said motor and said load member, two resetting elements having cooperative windings coupled respectively with said motor and said load member, a transmitting element interconnecting said resetting elements and having a winding adapted to be energized from an A.-C. source and further comprising a controlling member, said elements being adapted respectively to produce a control quantity dependent on the displacement of said motor and said load member respectively with respect to said controlling member, said transmitting and resetting elements further comprising selsyn devices having distributed windings interconnected with one another, and electrical means for applying said control quantities to said motor.

4. A control system in accordance with claim 3 further comprising potentiometer means for adjusting the relative magnitude of each of the control quantities applied to said electrical means.

5. A control system comprising, a motor, a main load member adapted to be driven by said motor, rigid driving connections between said motor and said load member, a selsyn transmitter driven by a controlling member, two selsyn receivers mechanically coupled to said motor and said load member respectively and electrically connected to said transmitter for producing two voltages each dependent on the displacement of said motor and said load member respectively from a position of correspondence with said transmitter, a generator connected to electrically operate said motor, and potentiometer adjusting means interconnecting each of said selsyn receivers with said generator for varying the relative proportion of the voltages supplied to the generator.

6. A position control system comprising a position transmitting member, a load member to be positioned, a motor connected to drive said load member, the driving connection between said load member and said motor providing a limited amount of lost motion, control means separately responsive to displacement between said transmitting member and said load member and between said transmitting member and said motor for producing a control quantity comprising two components, one said component being dependent upon the displacement between said transmitting member and said load member and the other said component being dependent upon displacement between said motor and said load member, and means for applying said control quantity to govern operation of said motor.

FREDERICK HAROLD BELSEY.
DAVID TRAVIS BROADBENT.

REFERENCES CITED

The following references are of record in the file of this patent:

UNITED STATES PATENTS

| Number | Name | Date |
|---|---|---|
| 1,672,677 | Ellis | June 5, 1928 |
| 1,977,624 | Davis | Oct. 23, 1934 |
| 2,176,102 | Riggs | Oct. 17, 1939 |
| 2,403,605 | Lesnick | July 9, 1946 |
| 2,415,080 | Bonnell | Feb. 4, 1947 |
| 2,451,263 | Webb | Oct. 12, 1948 |
| 2,537,083 | Peoples, Jr. | Jan. 9, 1951 |

FOREIGN PATENTS

| Number | Country | Date |
|---|---|---|
| 610,029 | Great Britain | Oct. 11, 1948 |